Sept. 29, 1959     D. B. MARTIN     2,906,432
DISPENSER
Filed May 27, 1957     2 Sheets-Sheet 1
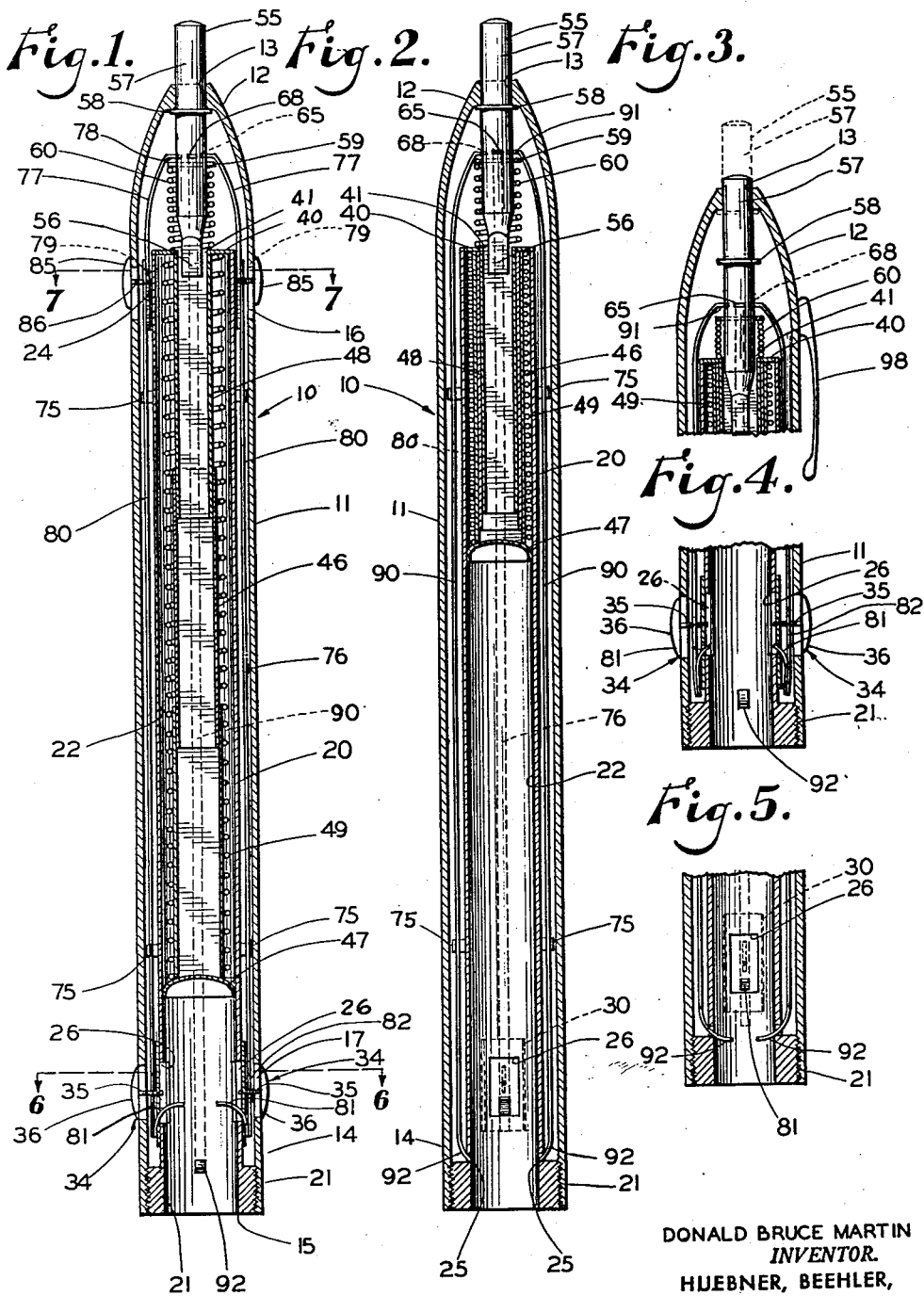
DONALD BRUCE MARTIN
INVENTOR.
HUEBNER, BEEHLER,
& WORREL
ATTORNEYS Sept. 29, 1959     D. B. MARTIN     2,906,432
DISPENSER
Filed May 27, 1957     2 Sheets-Sheet 2
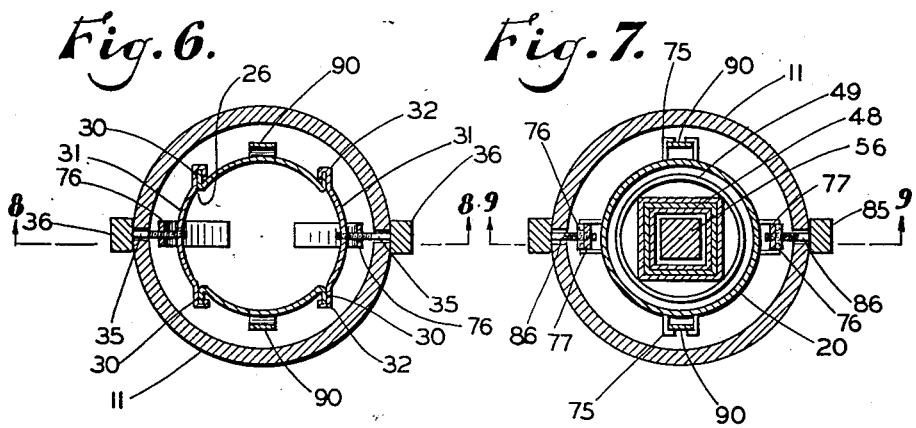
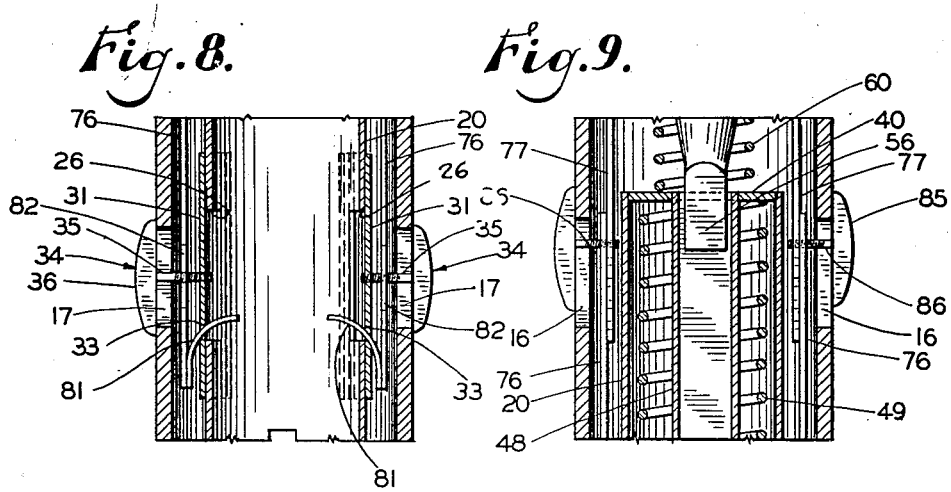
DONALD BRUCE MARTIN
*INVENTOR.*
HUEBNER, BEEHLER,
& WORREL
*ATTORNEYS*

United States Patent Office 2,906,432
Patented Sept. 29, 1959

2,906,432
DISPENSER
Donald Bruce Martin, Fresno, Calif.
Application May 27, 1957, Serial No. 661,680
2 Claims. (Cl. 221—207)

The present invention relates to a dispenser and more particularly to a pocket-sized device for dispensing articles such as pills, tablets, capsules, candy, candy-coated gum, and the like, and which is adjustable as to the number of articles dispensed at a time.

Devices for dispensing articles such as pills, tablets, spools of thread, marbles, and the like, have long been known as evidenced by the United States Patents Numbered 588,075 and 862,923. These and other similar dispensers have provided a hopper or holder for the articles and a chute leading downwardly to a dispensing opening. The articles gravitationally descend from the hopper or holder through the chute toward the dispensing opening. It has been known to provide upper and lower retaining and dispensing fingers transversely movable inwardly and outwardly of the chute for controlling release of the articles from the hopper and their emission from the dispensing opening. For example, Patent Number 862,923 provides such fingers alternately movable inwardly and outwardly of the chute whereby when the upper finger is in the chute it supports the articles thereabove. At the same time the lower finger is withdrawn from the chute and permits gravitational descent of the articles below the upper finger. When the positions of the fingers are reversed, the articles are supported by the lower finger. The cooperative action of the fingers is advantageous in that the upper finger locks off the supply of articles during dispensing of a predetermined number of articles. Further, this arrangement spaces the supply of articles from the actual dispensing opening.

However, none of the prior art dispensers of this nature have been readily adjustable to enable dispensing selected numbers of articles, as desired. The principle of alternately acting fingers has been applied in pill dispensers but repeated action of a manipulating lever or the like has been necessary to obtain more than one of a selected number of pills other than that for which the device is initially manufactured to dispense.

More recently dispensers for articles of the nature under discussion have been formed in the shape of a pen or pencil so as to enable them to be unobtrusively carried on the person, as in a coat pocket, or the like. These are especially useful for persons required to take pills at frequent intervals throughout the day. Such dispensers have not employed the above discussed principle of alternately acting fingers nor have they been adjustable in the manner described above. Some are not capable of dispensing pills freely gravitationally from their ends upon manipulation of a dispensing plunger or the like, but require tilting, tapping, shaking, jarring, or the like, in order to obtain a pill or other article. Still others dispense articles from their ends but hold the pills yet-to-be-dispensed in magazines or cartridges by friction and during ejection rub the articles against the magazines causing attrition of the articles.

Accordingly, it is an object of this invention to provide an improved dispenser for articles such as pills, tablets, capsules, candy, candy-coated gum, and the like.

Another object is to provide a pocket-sized dispenser for such purposes.

Another object is to provide a dispenser simulating a pen or mechanical pencil in external appearance.

Another object is to provide a dispenser which is readily adjustable as to the number of articles dispensed at a time.

Another object is to provide a dispenser which maintains the articles to-be-dispensed in sanitary condition.

Another object is to provide a dispenser which ejects articles freely and easily.

Another object is to provide a dispenser which is easy to load.

Another object is to utilize the principle of fingers which alternatively move in and out of a dispensing path through which articles to-be-dispensed move for controlling release of the articles from a supply thereof and for dispensing such articles.

Another object is to provide a dispenser which can accommodate a variety of sizes and shapes of articles to-be-dispensed.

Other objects are to provide a dispenser which is durable, dependable in action, attractive in appearance, and economical to manufacture.

In the drawings:

Fig. 1 is a longitudinal section through a dispenser embodying the principles of the present invention with a follower employed in the dispenser shown in extended position.

Fig. 2 is a longitudinal section of the dispenser taken on a plane displaced 90° from the plane of the section of Fig. 1 and with the follower retracted.

Fig. 3 is a fragmentary longitudinal section of an upper portion of the dispenser showing a plunger in depressed position in full lines and in retracted position in dashed lines.

Fig. 4 is a fragmentary longitudinal section of a lower portion of the dispenser taken along the same plane as Fig. 1 but showing fingers in alternate positions from that of Fig. 1.

Fig. 5 is a fragmentary longitudinal section of a lower portion of the dispenser taken along the same plane as Fig. 2 and showing the fingers in alternate positions from that of Fig. 2. The positions of the fingers in Fig. 5 correspond with their positions in Fig. 4.

Fig. 6 is a somewhat enlarged transverse section taken along a plane at a position represented by line 6—6 of Fig. 1.

Fig. 7 is a somewhat enlarged transverse section taken on a plane at a position represented by line 7—7 of Fig. 1.

Fig. 8 is a fragmentary longitudinal section taken on a plane at a position represented by line 8—8 in Fig. 6.

Fig. 9 is a fragmentary longitudinal section taken on a plane at a position represented by line 9—9 in Fig. 7.

Referring more particularly to the drawings, a pocket dispenser embodying the principles of the instant invention intended for articles such as pills, tablets, capsules, and the like, is generally indicated by the numeral 10. The dispenser includes an elongated, outer, substantially cylindrical housing 11 of plastic or metal, having an upper bullet-shaped tapered end 12 circumscribing an upper bore 13. The housing provides an internally threaded, slightly convergent lower end 14 circumscribing a dispensing opening 15. Additionally, the housing has a pair of opposed, longitudinally extended, upper slots 16, and a pair of opposed, longitudinally extended, lower slots 17 in longitudinal alignment with the upper slots. As seen in the drawings, the slots are respectively adjacent to opposite ends of the housing.

The dispenser 10 also includes an elongated inner tubular magazine 20 concentrically releasably fitted within the housing 11 having a lower, externally threaded open dispensing end 21 screw-threaded into the lower end 14 of the housing. The magazine provides an internal supply chamber 22 adapted to contain a column of articles, such as pills, capsules, tablets, or the like, not shown, to be dispensed and communicating with the open dispensing end 21. The magazine has an upper end 24 terminating below the upper end 12 of the outer housing 11, and is circumferentially spaced from the housing. The magazine provides a pair of spaced, transversely extended lower slits 25 adjacent to the dispensing end, and a pair of spaced, longitudinally extended windows 26 upwardly spaced from the lower slits in substantial registration with the lower slots 17 in the housing and in a longitudinal plane at substantially right-angular relation to a longitudinal plane passing through the lower slits.

The magazine 20 has longitudinally extended, flanged tracks 30 extended along opposite sides of the windows 26. Slides 31 are provided with outwardly concave longitudinal flanges 32 resiliently frictionally fitted on the tracks 30. The slides are longitudinally slidably movable along the tracks incident to application of slight longitudinal pressure on the slides. The slides provide opposed, transversely extended upper slits 33 spaced upwardly from the lower slits and by reason of their locations in the slides, longitudinally adjustable relative to the lower slits. Slide control members 34 include shanks 35 rigidly connected to the slides and extended outwardly thereof through the lower slots 17 in the housing 11. Buttons 36 are connected to the shanks for enabling manual manipulation of the control members.

An annular collar 40 is rigidly mounted at the upper end 24 of the magazine 20 and provides a central bore 41 disposed concentrically of the magazine and the housing 11.

An article follower 46 is mounted in the chamber 22 of the magazine 20 and includes a lower article engaging plate or head 47 slidable internally of the magazine, and a telescopic portion 48. The telescopic portion preferably includes three or more sections, at least the upper one of which is of square or other non-circular cross section and is fitted in the bore 41 of the collar 40. A main coiled compression spring 49 circumscribes the telescopic portion of the follower and is interposed the collar and the follower plate 47 for yieldably urging the plate toward the dispensing end 21 of the magazine.

A plunger 55 is slidably fitted in the upper bore 13 of the housing 11 and provides a lower end portion 57 slidably fitted in and corresponding in cross section to the upper section of the telescopic portion 48 of the follower 46. The plunger also has an upper preferably cylindrical end portion 57 extended endwardly of the housing, and an intermediate annular boss 58 within the housing adapted to abut the housing for limiting outward movement of the plunger relative to the housing. The plunger is thus mounted for slidable movement in the housing, as shown in Fig. 3, between a depressed position downwardly within the housing and a retracted position, as shown in Figs. 1 and 2, with the boss in abutment with the housing. An annular stop 59 is fitted around the lower end portion of the plunger, and a coiled, auxiliary compression spring 60 circumscribes the plunger between the stop and the collar 40.

The plunger 55 also provides diametrically opposite, supply control camming grooves 65 in the same longitudinal plane as the upper slits 33 and terminating in upper and lower transverse shoulders. The plunger also has diametrically opposite, dispense control camming grooves 68 in the same longitudinal plane as the lower slits 25 which likewise terminate in upper and lower transverse shoulders.

A plurality of guide tabs 75 are pressed outwardly from the magazine 20 at the upper and lower ends thereof for a purpose presently to be described. The tabs are respectively in longitudinal alignment with the slits 25 and 33.

A pair of elongated diametrically opposed supply control arms 76 is located between the magazine 20 and the housing 11 and is slidably received by oppositely-disposed tabs for guided slidable movement longitudinally of the magazine. The supply control arms provide upper resiliently flexible portions 77 having upper detents 78 yieldably inwardly fitted in the supply control camming grooves 65 and a plurality of longitudinally spaced internally threaded apertures 79 located generally opposite to the upper slots 16. The supply control arms also include lower elongated portions 80 overlapping the upper portions and having lower upwardly convex, resiliently flexible, supply control fingers 81 fitted in the upper slits 33 in the slides 31. The fingers are movable between inwardly extended positions in the supply chamber 22 and positions retracted from the chamber incident to longitudinal movement of the supply control arms. The lower portions of the arms provide elongated longitudinally disposed cut-outs 82 fitted over the shanks 35 for accommodating slidable movement of the arms over the shanks.

Setscrews 85 provide threaded shanks 86 extended through the upper slots 16 in the housing 11 and threadably mounted in the lower portions 80 of the supply control arms 76. The shanks of the setscrews further extend inwardly of the housing and screw-thread into selected apertures 79 in the upper portions 77 of the supply control arms depending upon the positions of the slides 31, as will be seen.

A pair of dispense control arms 90 is located between the housing 11 and the magazine 20 and is also slidably received by oppositely disposed tabs 75 for guided slidable movement longitudinally of the magazine. The dispense control arms have resiliently flexible upper detents 91 yieldably inwardly fitted in the dispense control camming grooves 68 and lower upwardly concave, resiliently flexible dispense control fingers 92 slidably fitted in the lower slits 25 of the magazine for movement between positions inwardly extended in the chamber 22 and positions retracted from the chamber. It is to be noted that the dispense control fingers are positioned below the supply control fingers and are movable between their extended and retracted positions upon longitudinal movement of the dispense control arms.

The dispenser 10 is preferably provided with an elongated clip 98 having an upper end secured to the upper end 12 of the housing 11 and a lower end resiliently pressed against the housing.

*Operation*

The operation of the described embodiment of the subject invention is believed to be readily apparent and is briefly summarized at this point. At the outset it is to be noted that the dispenser can be conveniently carried in the pockets of a coat, shirt, or the like, by means of the clip 98. As such, only the upper portion 12 of the housing 11 would ordinarily be visible. It is also to be noted that the dimensions of the dispenser can be designed to make the dispenser appear to look like an ordinary mechanical pen or pencil. In this regard it is to be noted that if it becomes necessary because of the size of the articles to be dispensed, the lower portion of the housing 11 and magazine 20 may be made diametrically larger than the upper portions of these elements. The purpose of such construction is to make that portion of the dispenser which is visible when the dispenser is positioned in a pocket have the appearance of a pen or pencil.

The articles, not shown, are loaded in the dispenser 10 by forcing them upwardly past the fingers 81 and 92. Because the fingers are of resiliently flexible material, they give way under pressure of the articles as they are forced upwardly in the magazine 20. Of course, the main spring 49 yields under such pressure to permit the articles to be forced upwardly against the follower plate 47. In turn, the main spring gently compresses the articles downwardly against the upper supply control fingers 81 which are normally in their inwardly extended positions when the plunger 55 is upwardly retracted. The dispense control fingers 92 are normally in outwardly retracted positions.

To adjust the dispenser 10 for dispensing a predetermined number of articles, not shown, the setscrews 85 are unthreaded until the shanks 86 are out of the apertures 79. Next the slide control members 34 are moved longitudinally and the slides 31 thereby moved upwardly or downwardly, as desired, relatively to the windows 26. This adjusts the longitudinal spacing between upper and lower slits 33 and 25 and at the same time adjusts the longitudinal spacing between the fingers 81 and 92. The frictional engagement of the flanges 32 and the tracks 30 holds the slides in whatever positions they are placed. The setscrews 85 are then screw-threaded into selected apertures 79 to connect the upper and lower portions of the supply control arms securely together.

When it is desired to obtain a quantity of articles, not shown, the plunger 55 is depressed. This forces the arms 76 and 90 downwardly of the housing 11, since the upper shoulders bear against the upper detents 78 and 91. Downward sliding of the arms causes the dispense control fingers 92 to move inwardly of the chamber 22 and the supply control fingers 81 to move out of the chamber. The follower 46 under the urgence of the main spring 49, then forces the supply of articles against the dispense control fingers.

The plunger 55 is then released whereupon the auxiliary spring 60 forces it into its retracted position. Upward movement of the plunger brings the lower shoulders into engagement with the detents 78 and 91 to pull the arms 76 and 90 upwardly. Upward movement of the arms slides the supply control fingers back into the chamber 22 between an adjacent pair of articles, not shown, and also retracts the dispense control fingers 92 from the chamber. Those articles which are below the supply control fingers are thus permitted to gravitate past the dispense control fingers, through the open dispensing end 21, and outwardly of the dispenser 10. It will be evident that the initial spacing between the fingers determines the number of articles to be dispensed.

From the foregoing it will be evident that a dispenser has been provided which has a unique dispensing mechanism suited for compact arrangement in a pocket-sized housing. The alternately acting fingers enable rapid and easy dispensing of articles from the device. The fingers are further readily adjustable to enable dispensing one or more articles of various sizes from the dispenser at a time.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A pocket dispenser for articles such as pills, tablets, capsules, and the like, comprising an elongated outer substantially cylindrical housing having an upper tapered end circumscribing a concentric bore, an open internally threaded lower dispensing end, a pair of opposed longitudinally extended upper slots, and a pair of opposed longitudinally extended lower slots aligned with the upper slots; an elongated tubular magazine concentrically extended within the housing having a lower externally threaded open dispensing end screw-threaded in the dispensing end of the housing, an internal supply chamber adapted to contain a plurality of articles to be dispensed and communicating with the dispensing end, an open upper end spaced from the upper end of the housing, a pair of opposed transversely extended lower slits adjacent to the dispensing end, a pair of opposed longitudinally extended windows upwardly spaced from the slits in substantial registration with the lower slots on the housing and in a longitudinal plane substantially perpendicular to the longitudinal plane passing through the lower slits, flanged tracks longitudinally extended along opposite sides of the windows, slides having flanges resiliently frictionally fitted on the tracks of the windows and being longitudinally slidable along the tracks incident to application of longitudinal pressure on the slides, the slides further having opposed transversely extended upper slits upwardly spaced from the lower slits and longitudinally adjustable relative to the lower slits upon movement of the slides; slide control members rigidly connected to the slides and extended outwardly through the lower slots; a collar mounted in the upper end of the magazine; an article follower mounted in the chamber of the magazine including a lower article engaging plate slidable against the magazine and a longitudinally concentrically extended telescopic portion having an upper open end mounted in the collar in coaxial relation to the bore; a main coiled compression spring circumscribing the telescopic portion of the follower and interposed the collar and the plate for yieldably urging the plate toward the dispensing end of the magazine; a plunger slidably concentrically fitted in the bore at the upper end of the housing having a lower end slidably fitted in the upper open end of the telescopic portion of the follower and an upper end extended outwardly of the housing, the plunger being movable between a depressed position and a retracted position and further having diametrically opposite supply control grooves in the same longitudinal plane as the upper slits and terminating in upper and lower transverse shoulders, and diametrically opposite dispense control camming grooves in the same longitudinal planes as the lower slits and terminating in upper and lower transverse shoulders; an annular stop mounted on the plunger intermediate its end; an auxiliary coiled compression spring circumscribing the plunger and interposed the stop and the collar for yieldably urging the plunger into retracted position; the magazine including guide tabs individually longitudinally aligned with the upper and lower slits; a pair of elongated diametrically opposed supply control arms located between the magazine and the housing slidably received by the tabs for guided slidable movement longitudinally of the housing between depressed and retracted positions and having upper and lower portions, the upper portions having upper resiliently flexible detents yieldably inwardly fitted in the supply control camming grooves and a plurality of longitudinally spaced apertures generally opposite to the upper slots, the lower portions overlapping the upper portions and having lower upwardly convex resiliently flexible supply control fingers slidably fitted in the upper slits in the slides and movable between inwardly extended positions in the chamber and positions withdrawn from the chamber incident to longitudinal movement of the supply control arms between retracted and depressed positions, respectively; setscrews threadably mounted in the lower portions of the supply control arms, extended outwardly through the upper slots in the housing, and selectively fitted in the apertures in the upper portions of the supply control arms depending on the positions of the slides; and a pair of elongated diametrically opposed dispense control arms located between the housing and the magazine slidably received by the tabs for guided slidable movement longitudinally of the housing between lower depressed positions and upper retracted positions and having resiliently flexible upper detents yieldably inwardly fitted in the dispense control camming grooves and lower upwardly concave resiliently flexible dispense control fingers slidably fitted in the lower slits in the magazine movable between positions inwardly extended into the chamber and positions withdrawn from the chamber below the upper fingers incident to longitudinal movement of the arms between depressed and retracted positions, respectively, the articles to-be-dispensed being gently compressed between the follower plate and the supply control fingers when the latter are in inwardly extended positions, the upper shoulders of the camming grooves abutting the detents of the arms incident to depression of the plunger to move the arms downwardly thereby to withdraw the supply control fingers and to extend the dispense control fingers into the chamber whereby the main spring urges the article into engagement with the dispense control fingers, the lower shoulders of the camming grooves engaging the detents incident to retraction of the plunger to move the arms upwardly thereby to extend the supply control fingers into the chamber between a pair of adjacent articles and to withdraw the dispense control fingers whereby the articles below the supply control fingers gravitate through the dispensing opening.

2. A pocket dispenser for articles such as pills, tablets, capsules and the like comprising an elongated tubular housing of a form simulating a fountain pen and having predetermined upper and lower ends providing openings into the interior of the housing; an elongated tubular magazine positioned longitudinally within the housing and fixedly mounted therein, the magazine having an outer wall portion in adjacent spaced relation to a portion of the housing, an open lower dispensing end in registration with the lower opening in the housing, an inner supply chamber adapted to contain a supply of articles to be dispensed, an upper end in spaced relation to the upper end of the housing, and a pair of transverse slits adjacent to the lower end of the housing in spaced relation longitudinally of the housing; a plunger slidably mounted in the opening of the upper end of the housing for movement longitudinally of the housing between a depressed position and a retracted position; resilient means positioned between the plunger and the upper end of the magazine yieldably urging the plunger into retracted position; and an elongated arm means longitudinally slidably extended in the space between the housing and the magazine having an upper end in driven association with the plunger whereby reciprocal movement of the plunger reciprocates the arm means and having a pair of arcuate spring fingers individually slidably extended through the slits, one thereof being downwardly concave and the other being upwardly concave and the fingers being so spaced along the control arm means so that when the plunger and arm means are depressed one of said fingers is extended into the magazine in blocking relation to the contents thereof and when the plunger and arm means are retracted the other of said fingers is extended into the magazine in blocking relation to said contents, the respective positions of the fingers in the magazine being such as to define a predetermined dispensing quantity of the articles therebetween.

References Cited in the file of this patent

UNITED STATES PATENTS

| | | |
|---|---|---|
| 584,999 | Goldsmith et al. | June 22, 1897 |
| 1,124,786 | Murchey | Jan. 12, 1915 |
| 1,524,420 | Bohlman | Jan. 27, 1925 |
| 2,073,328 | Wasserlein | Mar. 9, 1937 |